United States Patent
Rossi et al.

(10) Patent No.: US 9,404,791 B2
(45) Date of Patent: Aug. 2, 2016

(54) LATERAL, ANGULAR AND TORSIONAL VIBRATION MONITORING OF ROTORDYNAMIC SYSTEMS

(75) Inventors: Valerio Rossi, Florence (IT); Valerio Depau, Florence (IT)

(73) Assignee: Nuovo Pignone S.P.A., Florence (IT)

( * ) Notice: Subject to any disclaimer, the term of this patent is extended or adjusted under 35 U.S.C. 154(b) by 441 days.

(21) Appl. No.: 12/640,037

(22) Filed: Dec. 17, 2009

(65) Prior Publication Data

US 2010/0312504 A1   Dec. 9, 2010

Related U.S. Application Data (60) Provisional application No. 61/184,800, filed on Jun. 6, 2009.

(51) Int. Cl.
| | | |
|---|---|---|
| *G01H 1/10* | (2006.01) | |
| *G01H 1/00* | (2006.01) | |
| *G01H 9/00* | (2006.01) | |
| *G01H 11/02* | (2006.01) | |

(52) U.S. Cl.
CPC ............... G01H 1/003 (2013.01); G01H 9/00 (2013.01); G01H 11/02 (2013.01)

(58) Field of Classification Search
CPC .......... G01H 11/02; G01H 1/003; G01H 9/00
USPC ............. 702/41, 43, 44, 56, 57, 85, 105, 106, 702/127, 163, 183, 75, 79, 145, 151; 73/11.05, 579, 650, 660, 814, 862.324, 73/862.27; 74/5.95
See application file for complete search history.

(56) References Cited

U.S. PATENT DOCUMENTS

| | | | |
|---|---|---|---|
| 3,885,420 A | * | 5/1975 | Wolfinger ...................... 73/650 |
| 3,934,459 A | | 1/1976 | Wolfinger et al. |
| 4,064,704 A | | 12/1977 | Blackburn |
| 4,148,222 A | | 4/1979 | Wolfinger |
| 4,317,371 A | * | 3/1982 | Wolfinger ...................... 73/650 |
| 5,033,305 A | | 7/1991 | Rozelle et al. |
| 5,390,545 A | * | 2/1995 | Doan ............................. 73/650 |
| 5,686,669 A | | 11/1997 | Hernandez et al. |

(Continued)

FOREIGN PATENT DOCUMENTS

| | | |
|---|---|---|
| CN | 2060545 U | 8/1990 |
| CN | 1257196 A | 6/2000 |

(Continued)

OTHER PUBLICATIONS

Free Gear Software, Involute Gear and Spline software: Gear definitions and formulas, Jun. 20, 2003 pp. 1-7.*

(Continued)

*Primary Examiner* — John Breene
*Assistant Examiner* — Yaritza H Perez Bermudez
(74) *Attorney, Agent, or Firm* — GE Global Patent Operation (57) ABSTRACT

Exemplary embodiments provide a surface of a rotating element with both a phase reference mark and a plurality of additional marks. A proximity probe detects the passage of both the phase reference mark and the plurality of additional marks as they rotate through a detection zone. Both a phase reference signal and a vibration reference signal are generated, which signals are used to calculate lateral and angular (and optionally torsional) vibration of the rotating elements.

7 Claims, 6 Drawing Sheets

(56) References Cited

U.S. PATENT DOCUMENTS

| | | | |
|---|---|---|---|
| 5,970,784 A * | 10/1999 | Genin | 73/114.27 |
| 6,421,615 B1 * | 7/2002 | Nakajima et al. | 702/43 |
| 2007/0170913 A1 | 7/2007 | Yokotani et al. | |

FOREIGN PATENT DOCUMENTS

| CN | 1321241 A | 11/2001 |
|---|---|---|
| CN | 2720701 Y | 8/2005 |
| GB | 711 185 | 6/1954 |
| GB | 1273237 A | 5/1972 |
| GB | 2344177 A | 5/2000 |
| JP | 6097222 A | 5/1985 |
| JP | S62170518 U | 10/1987 |
| JP | 2911664 B2 | 6/1999 |
| JP | 2002310725 A * | 10/2002 |
| JP | 2006216185 A | 5/2006 |
| JP | 2008082879 A | 4/2008 |
| RU | 2045005 C1 | 9/1995 |
| SU | 348947 A | 8/1972 |
| SU | 996884 A1 | 2/1983 |
| SU | 1392414 A1 | 4/1988 |
| SU | 1755081 A2 | 8/1992 |

OTHER PUBLICATIONS

First Office Action issued in corresponding Chinese Patent Application No. 201010202715.7, date of issue Nov. 26, 2012.

Unofficial English translation of CN Office Action dated Aug. 30, 2013 from corresponding CN Application No. 20100202715.7.

Bi-Channel Vibration Analyzer "DIANA-2M", OOO Production and Inculcation Company "Vibro-Centre", pp. 3 and 21, 2008.

Unofficial English translation of RU Office Action issued Apr. 8, 2014 in connection with corresponding RU Patent Application No. 2010122735.

Unofficial English translation of JP Office Action issued Jun. 3, 2014 in connection with corresponding JP Patent Application No. 2010-121503.

European Search Report and Opinion issued in connection with corresponding EP Application No. 10164763.4 on Apr. 25, 2013.

Unofficial English Translation of Japanese Office Action issued in connection with corresponding JP Application No. 2010121503 on Mar. 1, 2016.

* cited by examiner

-- Prior Art --

LATERAL, ANGULAR AND TORSIONAL VIBRATION MONITORING OF ROTORDYNAMIC SYSTEMS

RELATED APPLICATION

This application is related to, and claims priority from, U.S. Provisional Patent Application Ser. No. 61/184,800, filed on Jun. 6, 2009, entitled "Angular and Torsional Vibration Monitoring of Rotordynamic Systems", the disclosure of which is incorporated here by reference.

TECHNICAL FIELD

The present invention relates generally to rotordynamic systems, and, more particularly to measuring, monitoring, and/or analyzing, vibration in each of one or more axial planes of rotating machinery, such as the shaft of turbomachinery.

BACKGROUND

Rotordynamic systems, such as turbomachinery (e.g., gas and steam turbines, compressors), generators, and other rotating machinery (e.g., electric motor driven systems) are generally monitored, continuously or intermittently, to, for example, control operation, protect against failure (which can be catastrophic and/or hazardous), assess fatigue, diagnose problems, and/or determine whether maintenance is required. Typically, turbomachinery includes radial (lateral) vibration and axial (longitudinal) displacement monitoring equipment, which is configured for long-term continuous and/or intermittent monitoring, without requiring the turbomachinery to be shutdown.

However, turbomachinery is usually not outfitted with angular or torsional oscillation monitoring equipment. Moreover, most known techniques for torsional vibration monitoring of rotordynamic systems are not well-suited for continuous (or intermittent) monitoring, and typically require shutting down the system to install the torsional vibration monitoring equipment (and to remove the equipment after testing. Additionally, such systems are intrusive and not certified for working in a potentially explosive, classified area which may include, for example, a purge system and, in some cases, a cooling system if the measurement has to be carried out in a hot area (e.g., next to a gas turbine exhaust duct). In the oil and gas business, system shutdown is often associated with a large monetary cost due to, for example, losses in oil and gas production and/or losses in energy generation.

Additionally, in the oil and gas industry, increasingly complex applications and tailor-made designs for individual customers present new and more complex rotor dynamic challenges. As a consequence, in addition to lateral vibration and/or axial displacement monitoring, torsional vibrations should be monitored and investigated during testing (e.g., to validate design) as well as during operation on-site over the long-term (e.g., continuously or intermittently, such as periodically, or in an on-demand or as-needed basis when unexpected issues occur). In other words, further advances in rotordynamic systems should provide built-in or in situ torsional vibration monitoring, which may operate continuously or intermittently, or as otherwise needed, and may be invoked while the turbomachinery is on-line, without requiring system shutdown. Accordingly, it would be desirable to design methods and systems for angular and torsional vibration measurement for turbomachinery.

SUMMARY

Exemplary embodiments provide a surface of a rotating element with both a phase reference mark and a plurality of additional marks. A proximity probe detects the passage of both the phase reference mark and the plurality of additional marks as they rotate through a detection zone. Both a phase reference signal and a signal used to calculate angular vibration of the rotating elements are generated.

Thus, according to one exemplary embodiment, a method for measuring both phase reference used for lateral vibrations and angular vibration associated with a rotordynamic system having a rotating element includes the steps of: detecting passage of a phase reference mark on the rotating element as the phase reference mark rotates through a detection zone associated with a detection device, detecting passage of additional marks on the rotating element, which additional marks are distinguishable from the phase reference mark, as the additional marks rotate through the detection zone, generating a phase reference signal based on the detection of the phase reference mark and generating a signal based on the detection of the additional marks using such signal to calculate angular vibration.

According to another exemplary embodiment, a rotordynamic machine includes a rotating element having a phase reference mark and a plurality of additional marks disposed around a circumference of a surface of said rotating element, wherein the phase reference mark and the additional marks are formed as depressions in the surface, and further wherein the phase reference mark has a different depth than the additional marks.

BRIEF DESCRIPTION OF THE DRAWINGS

The accompanying drawings illustrate exemplary embodiments wherein.

DETAILED DESCRIPTION

It will be appreciated by those skilled in the art that the following description is illustrative and explanatory of some embodiments of the present invention, but is not intended to be restrictive thereof or limiting of the advantages which can be achieved by this invention. Additionally, it is understood that while the following description is representative of some embodiments of the invention, it is not necessarily inclusive of all subject matter and embodiments within the scope of the present invention.

Moreover, as will be understood by those skilled in the art, while the ensuing description is set forth with respect to turbomachinery embodiments, embodiments of the present invention include systems and methods for analyzing, measuring, monitoring, diagnosing, assessing, and/or otherwise determining both lateral vibration phase reference and angular vibration, in myriad rotordynamic systems. Initially some discussion of vibration per se will be useful for context. Vibration is a dynamic phenomenon which can be described as an oscillatory motion around an equilibrium position. Vibration is caused by the transfer or storage of energy within objects that is the result of the action of one or more forces. Vibration can be categorized as being either "translational" (i.e., acting in one or several linear degrees-of-freedom) or "angular" (i.e., acting in one or several angular degrees-of-freedom). For angular vibrations, the forcing function involves one or more moments instead of a "linear" force acting on the object. Finally, torsional vibration can be determined by taking a difference of the angular vibration measured in two distinct sections multiplied by the shaft stiffness between the two sections.

Figure 1:
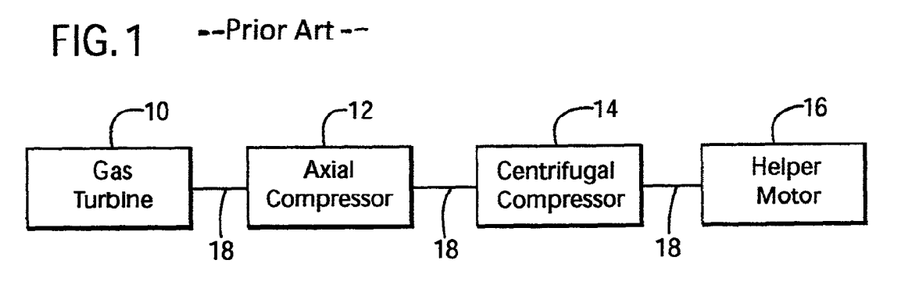
FIG. 1 shows an exemplary turbomachine drivetrain in which exemplary embodiments may be implemented.

The phase of the lateral or radial vibration signal is the timing relationship between an event in the vibration signal (usually the maximum value in a cycle) and the pulse given by the phase reference signal. Having information on the lateral vibration phase greatly helps in diagnostics activities and when the machine has to be balanced on rotating elements of turbomachinery including, for example, steam/gas turbines, compressors, electrical motors and generators, and load gearboxes. In the drivetrains associated with such equipment, vibration can be an important cause of failure as it introduces unintended stresses on the equipment elements. Purely as an example, FIG. 1 illustrates a typical turbomachinery drive train in which it may be useful to measure lateral and angular (and/or torsional) vibration in order to compensate for, or otherwise address, vibrational stresses. Therein, a gas turbine 10 is connected to an axial compressor 12, which is in turn connected to a centrifugal compressor 14, which is itself connected to a helper motor 16. A plurality of interconnecting, rotating shafts 18 and gearboxes (not shown), as well as other interconnections which will be appreciated by those skilled in the art, operate to transfer rotational energy between the units connected by the drive train.

Figure 2:
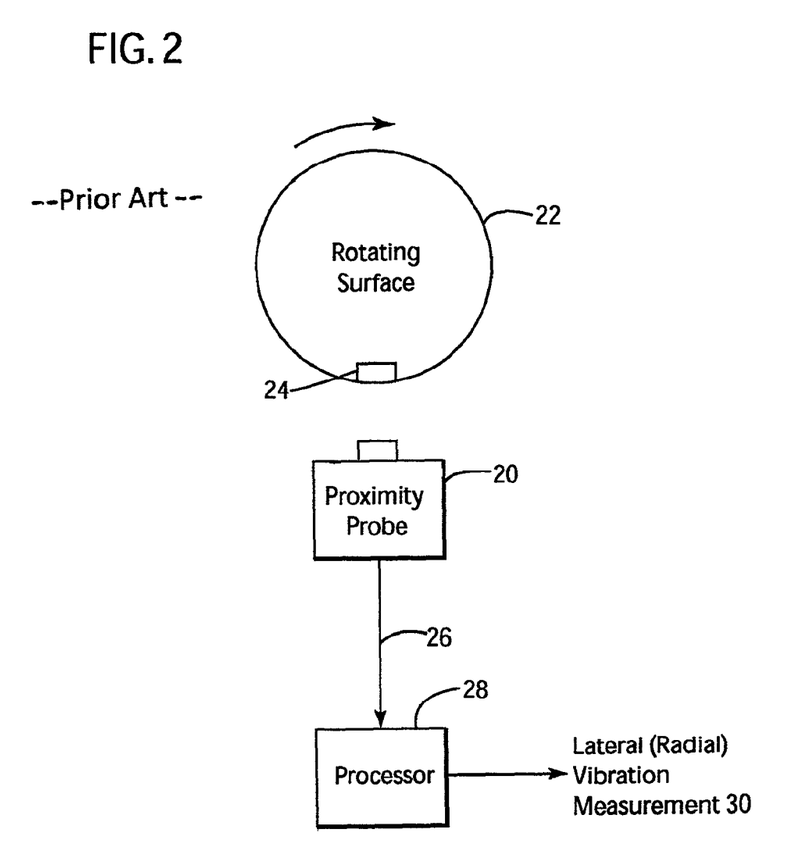
FIG. 2 illustrates a lateral vibration measurement according to background art.

One way in which lateral vibration phase reference has been measured in such drivetrains is illustrated conceptually in FIG. 2. Therein a proximity probe 20, e.g., an eddy current sensor or optical detector, is placed near a surface of a rotating element 22, e.g., a circumference of one of the shafts 18 described above, into which a mark or depression 24 is formed. Each time that the portion of the surface of the rotating element 22 containing the mark or depression 24 passes by the proximity probe 20, the proximity probe recognizes the variance in the surface, e.g., due to the difference depth presented by the mark 24 relative to the rest of the surface, and generates a once per revolution signal 26. This signal is sometimes referred to as a "phase reference signal", as the once per revolution signal can be used to provide a phase angle reference for the rotating element 22, which phase is also used herein to describe this particular signal. Thus the mark or depression 24 can be termed a phase reference mark 24, but is also sometimes referred to as a "KEYPHASOR" mark, which term is a trademark of the Bentley Nevada Company. The phase reference signal can be passed to a data analyzer or other processor 28 wherein it can be used to calculate the phase of the filtered lateral (radial) vibration measurement 30. Thus the combination of the proximity probe 20 and the phase reference mark 24 can be used by the detection system to provide either or both of speed of rotation information and phase angle information for the rotating element 22.

Torsional vibration occurs when a shaft is twisted first in one direction about its axis and then in the other direction about its axis. Accordingly, torsional vibrations can be determined by making angular vibration measurements in two different locations on the shaft and taking their difference. Torsional vibrations occur in the drive trains of turbomachinery, and, if not detected can cause system failures. In accordance with exemplary embodiments of the present invention, in a rotordynamic system, each of at least one rotating component that transmits torque (e.g., a coupling or a shaft), or that may not transmit torque but is mechanically coupled to and rotates with a torque transmitting component (e.g., a nut, a bolt or a wheel, attached to the shaft directly or attached indirectly through one or more other components), is manufactured to include a phase reference mark as well.

Figure 3:
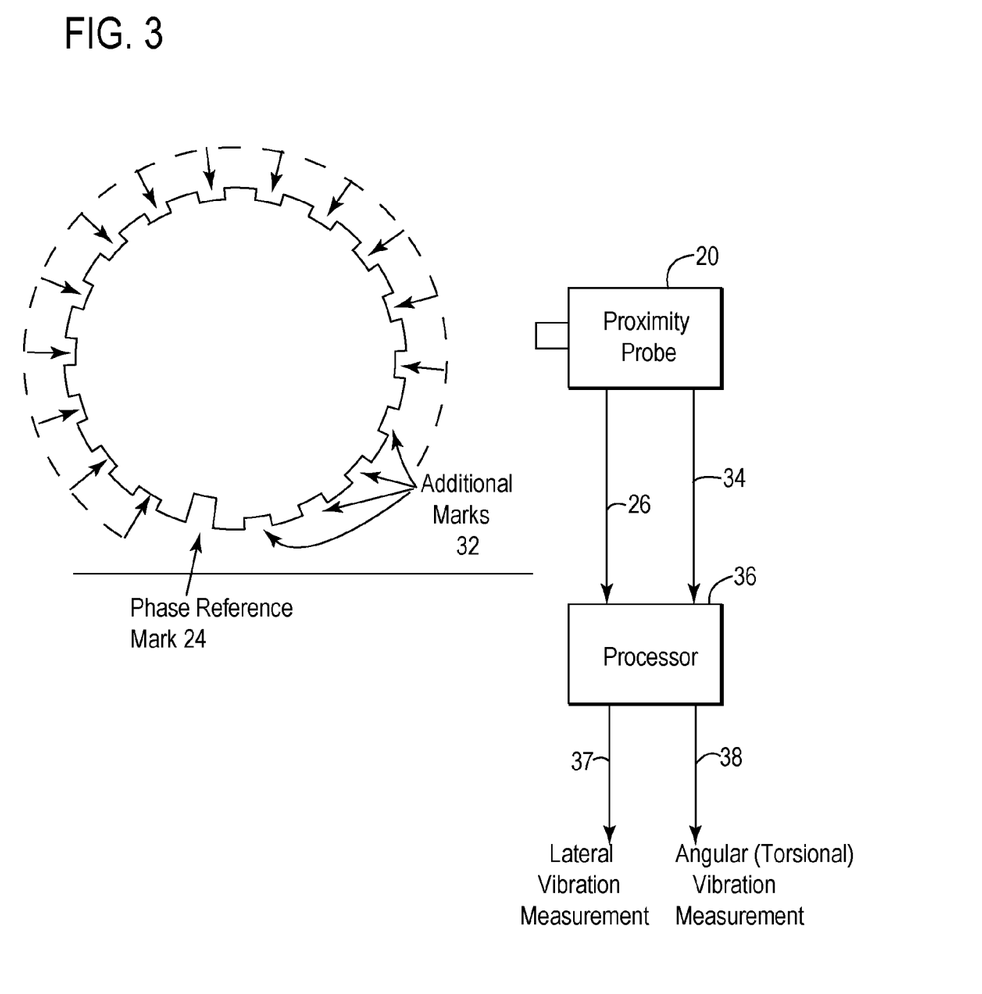
FIG. 3 illustrates a combined lateral and angular vibration measurement system according to an exemplary embodiment.
Figure 4:
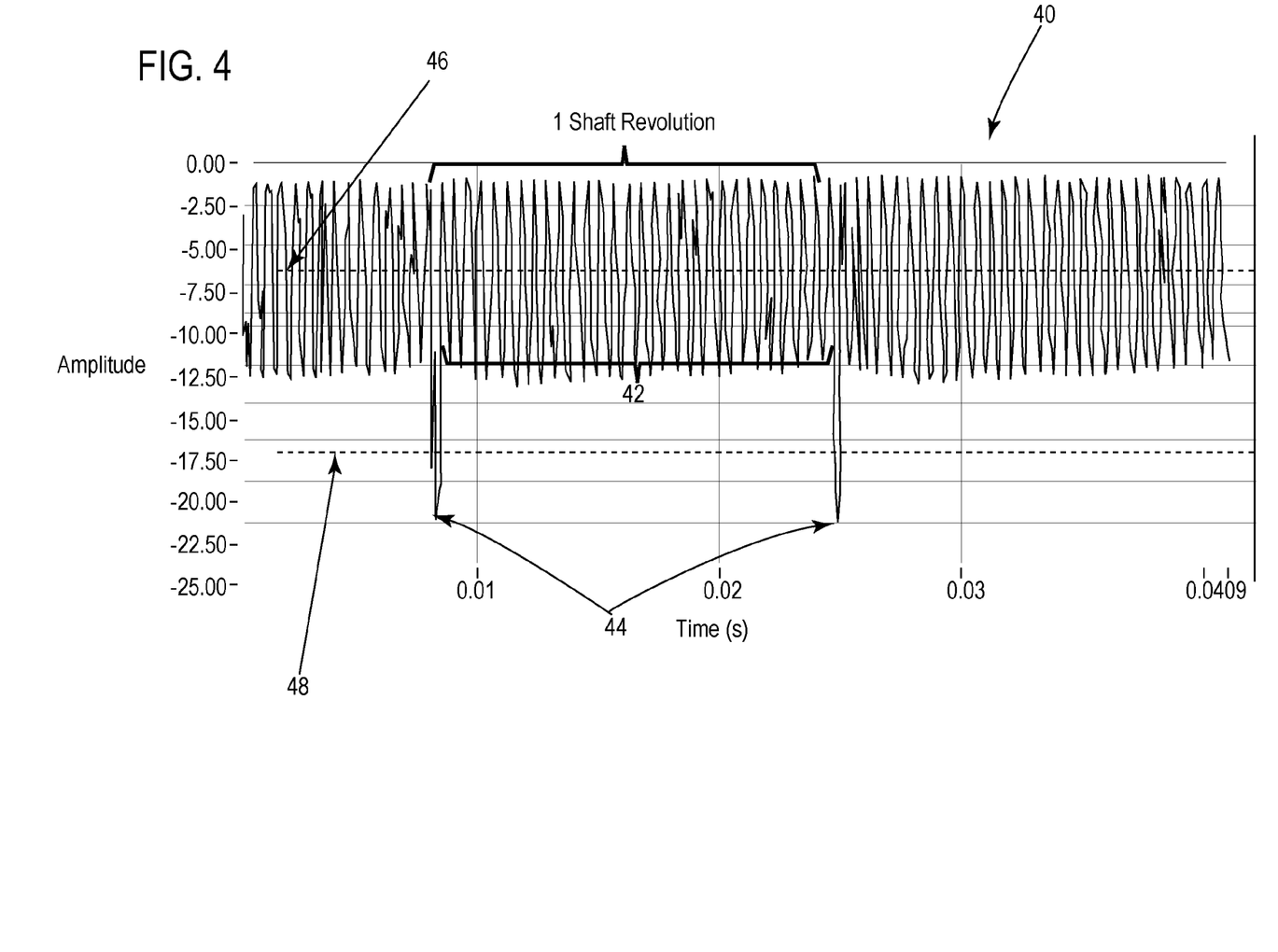
FIG. 4 depicts a waveform associated with combined phase reference and angular vibration measurement system according to an exemplary embodiment.

An exemplary embodiment illustrating the combination of a single phase reference mark 24 and a plurality of additional marks 32 is shown in FIG. 3. Therein the additional marks 32 are distinguishable from the phase reference mark 24 such that upon sensing the phase reference mark 24, the transducer 20 generates a phase reference signal 26 that is distinguishable from the signals 34 generated by the transducer 20 upon sensing the additional marks 32. It will be appreciated by those skilled in the art that although two arrows 26 and 34 are illustrated in FIG. 3 to conceptualize the different information that is derived from the sensing of the different types of marks 24 and 32, respectively, that physically this can be transmitted from the proximity probe 20 to the processor 36 as a single signal or as a single stream of data. For example, as seen in FIG. 4, the proximity probe 20 can generate a continuous waveform of data which, when sampled, may be displayable as waveform 40, e.g., by processor 36 on an associated display (not shown). It will be seen in FIG. 4 that waveform 40 has a relatively large number of pulses, e.g., pulses 42, which are attributable to the passage of the additional marks by the proximity probe 20. Fewer pulses 44 attributable to the passage of the phase reference mark 24 are also shown. Thresholds 46 and 48 can be set as desired to enable the processor 36 to distinguish between pulses 42 and 44, respectively, i.e., to characterize the correct pulses as being associated with the phase reference mark 24.

As such, the information acquired by the proximity transducer 20 at a given axial position along the shaft of a rotordynamic system according to these exemplary embodiments is well suited (e.g., due to the additional marks) for providing data to generate both a phase reference lateral vibration measurement 37 and an angular (and/or torsional) vibration measurement 38. While a given probe 20 detects both the phase reference mark 24 and the additional marks 32 on a given rotating component, it may be appreciated that more than one proximity probe may be aligned to detect the marks on the given rotating component to compensate the components due to lateral vibration. More specifically, each of a plurality of probes may be aligned to respectively detect both the phase reference and additional marks from a given rotating component.

As will be understood by those skilled in the art, because the additional marks provide for additional samples per revolution, they enable and/or improve angular vibration measurement based on tip timing analysis. For example, generally, increasing the samples per revolution increases the bandwidth of the angular vibration spectrum and also increases the range of RPMs over which the angular vibration spectrum may be determined (e.g., providing for analysis at lower RPMs, such as during ramp-up or ramp-down). Providing the additional marks on the same rotating component as the phase reference mark provides, for example, for easier and more cost-effective design, and/or retrofitting, of a rotor-dynamic system to include long-term (e.g., built-in or in situ) angular and torsional vibration monitoring. For example, any rotating component that conventionally includes a phase reference mark may be manufactured to include additional distinguishable marks, thus providing for angular (torsional) vibration monitoring without significant modification of current system designs (e.g., additional proximity probes may not be needed; additional rotating components having marks need not be added, etc.). In accordance with various implementations, each plane of a turbocompressor system (e.g., a train) which conventionally includes a phase reference mark may be modified to also include one or more additional marks that are distinguishable from the phase reference mark 24.

Figure 5:
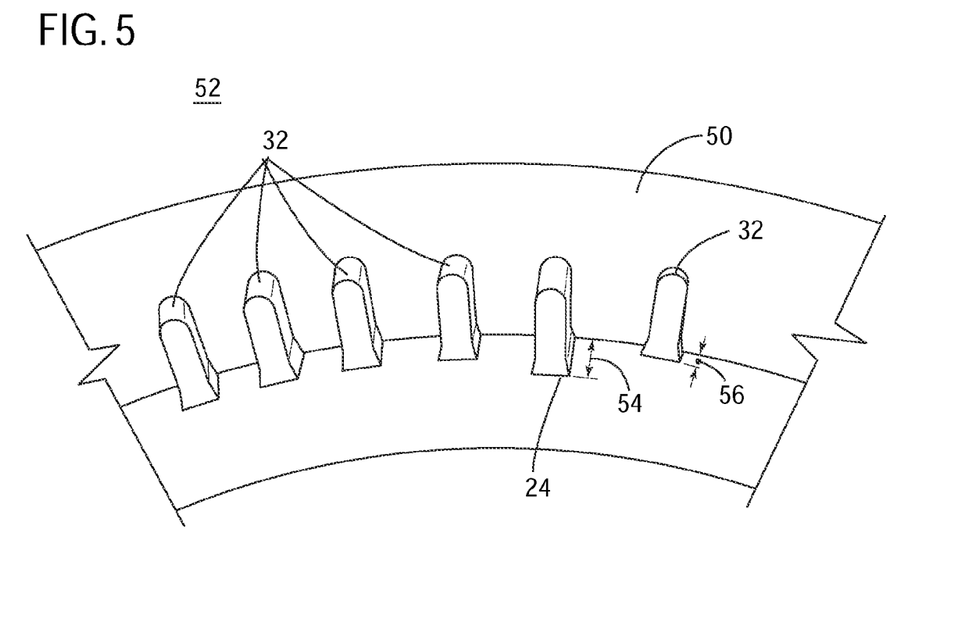
FIG. 5 shows the disposition of a phase reference mark and a plurality of additional marks according to an exemplary embodiment.

FIG. 5 illustrates another example of the provision of additional marks 32 on a surface 50 of a rotating element 52 which also contains a phase reference mark 24 according to exemplary embodiments. Therein, it can be seen that the phase reference mark 24 is deeper than the additional marks 32, each of the latter of which having the same or a similar depth. This manner of differentiating the marks may be appropriate where, for example, the proximity probe 20 is implemented as an eddy current sensor, which detects distances from the proximity probe 20 to the surface 50 of the rotating element 52 based on changes in a magnetic field generated by the proximity probe 20. The different depths of the phase reference mark 24 and the additional marks 32 result in different detected distances as the rotating element 52 rotates through a detection zone associated with the proximity probe 20. According to one purely illustrative example, the depth 54 of the phase reference mark 24 can be 1.5-2 times deeper than the depth 56 of the additional marks 32, however those skilled in the art will appreciate that the relative depth difference may vary based upon implementation details. In this exemplary embodiment, the width of all of the marks can be the same or substantially the same. According to some exemplary embodiments, the number N of additional marks 32 which are formed in, or disposed on, the surface may be determined by the following relationship:

$N=\pi d/2x$, where:

d is a diameter of the surface on which the phase reference mark and the plurality of additional marks are disposed; and x is the width of the existing phase reference mark.

If the relationship results in a non-integer number N of marks, the number can, for example be rounded down to the nearest integer.

Regardless of the particular implementation whereby a phase reference mark 24 and a plurality of additional marks 32 are provided to a surface of a rotating element for detection, the proximity probe 20 will detect each of the marks as it rotates through a detection zone and generate data associated therewith. Processor 36 receives that data and processes it to generate both a lateral vibration phase reference measurement 37 and an angular vibration measurement 38. According to one exemplary embodiment, this can be accomplished using the processing methodology illustrated in the flow diagram of FIG. 6. Therein, at step 60, the processor 36 receives and processes the raw data which it receives from the proximity probe 20 (transducer). For example, the signal output by the transducer can be analyzed to identify the times at which each mark passes the transducer. The timing of each such transducer passing event (or, equivalently, from the transducer's perspective, each mark arrival event) may be determined as the time that the signal equals a user-set threshold. Various signal processing techniques (e.g., interpolation and/or curve-fitting on the raw signal rising edge) may be applied to improve the accuracy of determining each of the transducer passing or mark arrival events. Next, at step 62, the revolution speed versus time of the rotating element 52 is calculated as dq/dt where: dq [°] is tooth-to-tooth angle and dt is tooth-to-tooth time delay [s].

Figure 6:
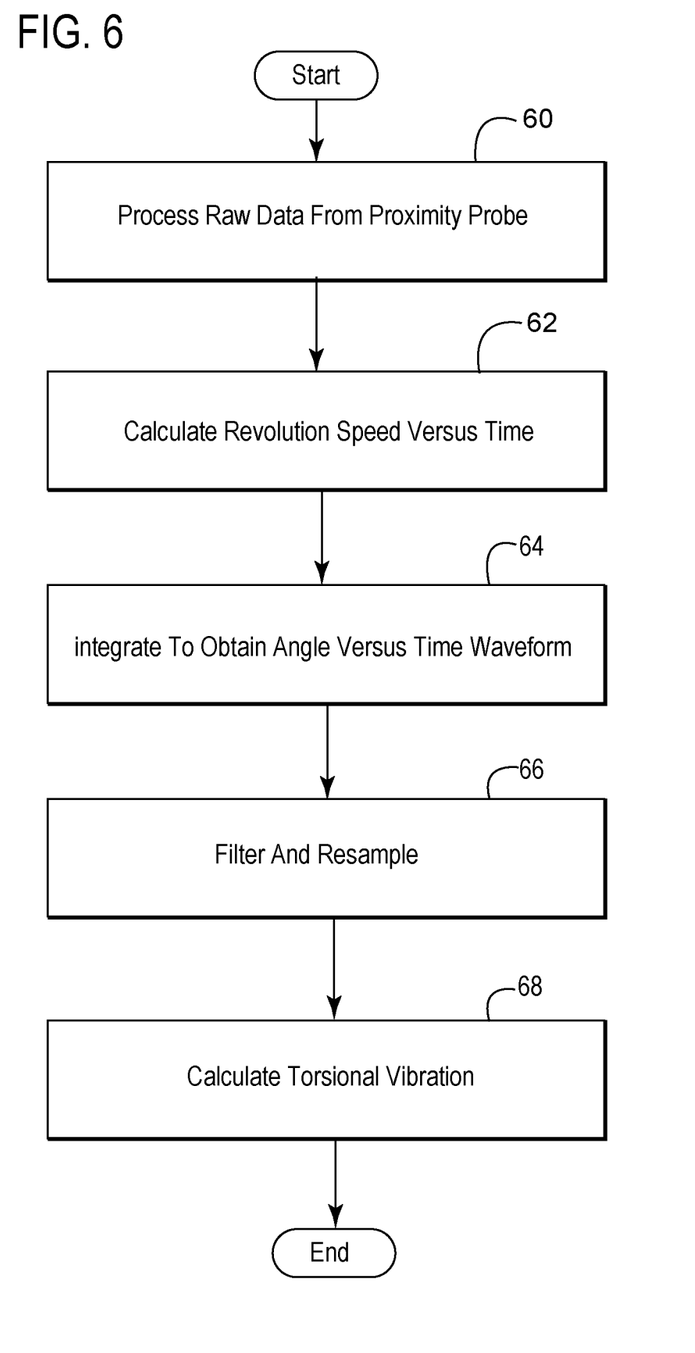
FIG. 6 is a flowchart illustrating processing of data generated from a detection of a phase mark and a plurality of additional marks according to an exemplary embodiment.

The speed versus time distribution is then integrated at step 64 to obtain an angle versus time waveform. This waveform may optionally be filtered step 66 to obtain an angular vibration versus uniform time distribution to provide the angular vibration spectrum, and/or resampled based on the requested spectral bandwidth. If it is further desired to calculate the torsional vibration, then this parameter may then be calculated as the difference of the angular vibrations determined at two different sections of the rotating element 52. Moreover, alternating torque can be also calculated given the stiffness of the rotating element 52. The angular vibration measurement 38 may be expressed in terms of frequency and amplitude. However it has been learned that the measured angular vibration amplitude may be underestimated using the above described structures and methodologies.

Specifically, it has been determined that the measured angular vibration amplitude is a function of the actual angular vibration amplitude, the number of events (marks), and the frequency of the angular vibration. If only the phase reference mark is used a corrective factor should be applied to the measured results in order to arrive at the correct amplitude value, according to exemplary embodiments, as part of the process for generating the angular vibration measurement, e.g., after either of steps 64 or 66 described above. The corrective factor C may be determined by simulation using a known angular vibration input (i.e., having a known frequency and a known amplitude A1) and determining a measured angular vibration amplitude $A_{measured}$ in the manner described above. The correction factor C may then be determined as $C=A_{measured}/A1$. When the system is operating, the correction factor C may then be used to compensate the measured angular vibration such that the amplitude portion A of the angular vibration measurement signal 38 is calculated as $A=A_{measured} \times C$. Advantageously, such a corrective factor provides for improved accuracy, and also enables accurate determination of angular vibrations under conditions of a low number of events/sec (e.g. at low RPMs and/or when the rotating component has a small number of marks/revolution).

Figure 7:
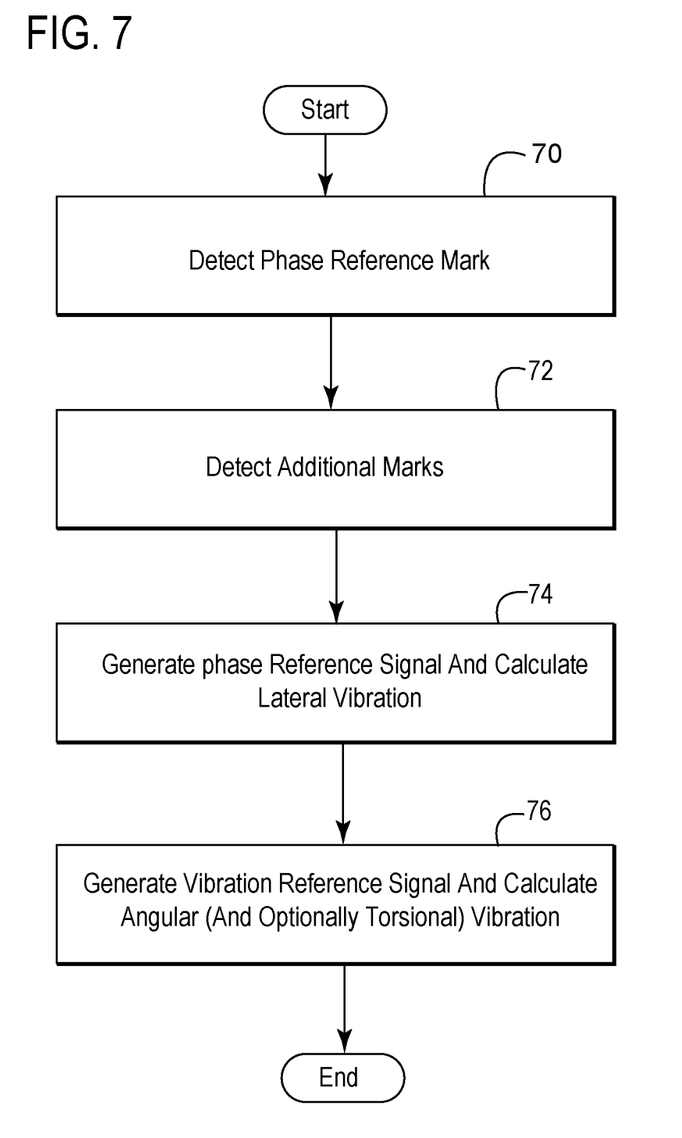
FIG. 7 is a flowchart depicting a method for measuring lateral vibration and at least one of angular and torsional vibration according to an exemplary embodiment.

Thus a method according to exemplary embodiments for measuring both lateral vibration phase reference and also at least one of angular vibration associated with a rotor dynamic system having a rotating element may include the steps illustrated in the flowchart of FIG. 7. Therein, at step 70, a phase reference mark is detected as it rotates through a detection zone associated with a detection device. Similarly, additional marks which are distinguishable from the phase reference mark, are detected as they pass through the detection zone as shown in step 72. A phase reference signal is then generated based on the detection of the phase reference mark at step 74. A vibration reference signal is generated at step 76 based on the detection of the additional marks and used to measure one of angular vibration and torsional vibration.

Numerous variations and permutations on the foregoing are contemplated. For example, it will be appreciated that, e.g., for retrofit implementations where lateral vibration measurement hardware is already in place, angular (and optionally torsional) vibration measurement hardware can be added according to exemplary embodiments to measure angular vibration using only the phase reference signal generated by the phase reference mark to determine angular vibration and then correcting the amplitude of the resulting angular vibration measurement as described above. In this way, machinery which is already in operation can be monitored for angular/torsional vibration without shutting down the machinery. Alternatively, for implementations where the aforedescribed additional marks are present on the operating machinery, lateral vibration measurement and angular vibration measurement can be performed separately and/or in parallel. For such embodiments, the flow diagram of FIG. 7 could be modified to have two parallel branches, e.g., one for measuring lateral vibration (phase reference) including steps 70 and 74 and one for measuring and one for measuring angular (or torsional) vibration including steps 72 and 76

As used herein, a rotating component includes any mechanical structure or feature that is removably fastened (e.g., using bolts), irremovably fastened (e.g., by welding), or integral with (e.g., flange portion), and that rotates with, a rotor or shaft of a rotordynamic system (e.g., turbo-machinery). For instance, a rotating component may include, but is not limited to, a hub, a flange, a nut (e.g., a bearing lock nut), a gear or diaphragm or disc coupling, a toothed or geared wheel fixably attached (e.g., bolted or welded) to such a coupling. By way of example, such a rotating component may comprise a coupling component or other component attached (e.g., welded or bolted) to the shaft at a given axial position. In accordance with some embodiments of the present invention, any such rotating component may be adapted or configured to include circumferentially disposed marks (e.g., teeth, grooves, slots, bolts, etc.) that may be detected by a transducer (e.g., a proximity sensor, such as an eddy current probe) as the rotating component rotates while the rotordynamic system is operating. In some embodiments, a rotating component comprises a portion of the shaft itself that may be configured (e.g., by milling) with a phase reference mark and additional marks.

As used herein, a mark on a rotating component includes any feature or structure which may be formed, for example, by the removal of material, or by the addition of material, or by the addition or attachment of another component, and which may be detected by a probe (e.g., a proximity probe and/or an optical probe) aligned to view (detect) the mark (target) as the rotating component rotates. For example, a mark may be formed (e.g., by milling) as a notch, groove, tooth, keyway, into an outer or inner surface of a wheel, nut, or hub. Also by way of example, a mark may be a bolt or lump (e.g., welded feature) or other raised target on a wheel, nut, hub, shaft, flange or other rotating component.

Such a method and/or system for providing lateral vibration phase reference, angular vibration and optionally also torsional vibration (if more than one measurement section is available) may be implemented in hardware and/or software. For example, a CompactRIO (CRIO) system which uses floating point gate array (FPGA) devices can be programmed to acquire data from multiple transducer channels, determine the angular vibration corresponding to each channel, and determine torsional vibrations based on differences in angular vibration between channels. Such a processing method and system to determine angular vibration is not limited to processing signals acquired by proximity probes, but may also be applied to signals acquired by other types of probes, such as an optical (e.g., laser) probe that monitors marks or other indicia on a rotating component. The advantages of using a CRIO hardware include, for example: i) it is extremely portable; ii) the hardware is robust and reliable (can be placed for years for continuous operation); iii) using the software with the corrective factor can be used using only the phase reference signal (one mark only) for calculation of the angular vibration. Therefore, with the above-described approach, in case of emergency, the device can be transported to a machine site and installed with the turbomachinery unit in operation and without any modification. By way of contrast, state of the art methods for torsional vibration measurements are invasive and always require a halt of the unit.

Thus it will be appreciated that exemplary embodiments enable vibration measurements using, for example, signals that are generally found in industrial applications. Signals that can be found in most machines and that can be used to overcome these vibration measurement challenges include, but are not limited to, the speed signals from a magnetic pick up on a teeth geared wheel (as for example a well with 60 teeth) and the phase reference signal used in lateral vibrations in monitoring or measurement systems given by an eddy current probe on a single mark on the shaft.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for determining vibration associated with a rotordynamic system having a rotating element, the method comprising:
   detecting passage of a phase reference mark on the rotating element as the phase reference mark rotates through a detection zone associated with a detection device;
   detecting passage of a plurality of additional marks on the rotating element, wherein the plurality of additional marks are distinguishable from the phase reference mark, as the plurality of additional marks rotate through the detection zone;
   generating a phase reference signal based on the detection of the phase reference mark and using the phase reference signal to determine a lateral vibration;
   generating a vibration reference signal based on the detection of the plurality of additional marks and using the vibration reference signal to measure an angular vibration; and
   applying a correction factor to an amplitude portion of the measured angular vibration to compensate the measured angular vibration.

2. The method of claim 1, wherein the applying a correction factor further comprises:
   multiplying the amplitude portion of the measured angular vibration by the correction factor, wherein the correction factor is determined based upon simulation results.

3. The method of claim 1, wherein a number of the plurality of additional marks formed on the rotating element is equal to $\pi d/2x$, where:
   d is a diameter of the surface on which the phase reference mark and the plurality of additional marks are disposed; and
   x is a width of the phase reference mark.

4. The method of claim 1, wherein the detecting passage are performed using an eddy current sensor.

5. The method of claim 1, wherein the detecting passage are performed using an optical detection device.

6. The method of claim 1, wherein the phase reference mark has a different depth on the rotating element than the plurality of additional marks.

7. The method of claim 1, wherein the phase reference mark and the plurality of additional marks have a pitch that is approximately the same.

* * * * *